(12) United States Patent
Shlomai (10) Patent No.: US 7,913,252 B2
(45) Date of Patent: Mar. 22, 2011

(54) PORTABLE PLATFORM FOR EXECUTING SOFTWARE APPLICATIONS IN A VIRTUAL ENVIRONMENT

(75) Inventor: Netzer Shlomai, Ra'anana (IL)

(73) Assignee: Installfree, Inc., Stamford, CT (US)

( * ) Notice: Subject to any disclaimer, the term of this patent is extended or adjusted under 35 U.S.C. 154(b) by 1019 days.

(21) Appl. No.: 11/697,700

(22) Filed: Apr. 6, 2007

(65) Prior Publication Data

US 2007/0240155 A1  Oct. 11, 2007

Related U.S. Application Data

(60) Provisional application No. 60/744,598, filed on Apr. 11, 2006.

(51) Int. Cl.
*G06F 9/455* (2006.01)
*G06F 9/45* (2006.01)
*G06F 9/44* (2006.01)
*G06F 9/46* (2006.01)

(52) U.S. Cl. .................. 718/1; 703/22; 703/23; 703/24; 719/319

(58) Field of Classification Search .. 718/1; 703/22–24; 719/319
See application file for complete search history.

(56) References Cited

U.S. PATENT DOCUMENTS

| 6,986,030 | B2 | 1/2006 | Shmueli et al. | |
|---|---|---|---|---|
| 7,296,144 | B2 * | 11/2007 | Bryant-Rich et al. | ......... 713/100 |
| 7,441,108 | B2 * | 10/2008 | Fisher et al. | .................. 712/227 |
| 7,496,931 | B2 * | 2/2009 | Cook et al. | .................... 719/327 |
| 7,606,973 | B2 * | 10/2009 | Bao et al. | ....................... 711/115 |
| 2003/0221087 | A1 * | 11/2003 | Nagasaka | ..................... 712/209 |
| 2004/0095382 | A1 | 5/2004 | Fisher et al. | |
| 2005/0114643 | A1 | 5/2005 | Bryant-Rich et al. | |
| 2005/0240918 | A1 | 10/2005 | Shlomai | |

* cited by examiner

*Primary Examiner* — Qing Wu
(74) *Attorney, Agent, or Firm* — Myers Wolin LLC (57) ABSTRACT

A portable platform for executing software applications on a computing device without installing or configuring the applications on the computing device. Furthermore, the execution of the applications is performed without making any changes or modifications to the computing device's memory or file system. The portable platform can reside on, for example, a portable memory device, a portable storage device, or downloaded from a web site.

31 Claims, 8 Drawing Sheets

FIG. 6B ent invention relates generally to the execution of software applications, and more particularly to a method for executing software applications on a portable memory device.

BACKGROUND OF THE INVENTION

Personal computers (PCs) serve a multitude of software applications, features and functions. The applications provide the user with tools to accomplish tasks, such as (but not limited to) document processing, spreadsheet management, email exchanges and Internet browsing. The features and functions are commonly referred to as the "personalized information" and may comprise favorite Internet websites, contacts, Internet cookies, digital signatures, background images, desktop icons, application control bars, choice of default values and other configurable settings. In general, the personalized information differs from one user to another.

Typically, software applications are installed and setup using an automated installation process. The installation process is designed to enable the integration of the new functionality into the overall organization of the operating system (OS), as well as ensuring that the application can be safely removed. Still, as an installation process is mostly carried-out by automatic installation programs, installation and setup of software applications remain a tedious task requiring as much as hours of work.

Generally, an automatic installation program performs the following activities: a) copying application software files from a removable storage (e.g., a compact disk) to the destination computer; b) configuring the operating system's parameters by, for example, the configuration of the system registry files; c) creating the application icons; and d) deleting temporary installation files.

Normally, software applications are executed exclusively within the environment in which they were actually installed. Specifically, a software application ought to be installed on each computer that runs the application. As a result, a user cannot switch between computers and work with his common applications without installing and registering those applications on each computer. Moreover, the user has to configure the personalized information when switching between computers.

In the related art, there are a few solutions for enabling the execution of applications without installing them on a computer. An example for such solution is disclosed in US patent publication 20050240918 (hereinafter the '918 application) now U.S. Pat. No. 7,600,216 by Shlomai, incorporated herein by reference for the useful understanding of the background of the invention. The method disclosed in the '918 application allows users to plug-in a portable memory device (PMD) equipped with at least one software application, and executing the software application from the PMD without installing the application. This is achieved by capturing system calls of the OS of the host computer and directing these calls to the PMD.

The approach of re-directing system calls introduces several drawbacks that prevent applications from being executed in a real virtual environment. For example, a computer executing software applications installed on the PMD is vulnerable, as such applications have the permission to write and access the file system of the computer. That is, each application installed on the PMD is an enabler for a security and privacy breach if that application is penetrated. In addition, as the PMD's applications use the local file system, they suffer from performance and functionality limitations.

Therefore, it would be highly desirable to provide a solution that allows a user to run the user's common applications in a virtual environment on any computer.

SUMMARY OF THE INVENTION

The present invention includes a portable platform for executing software applications on a computing device without installing or configuring the applications. Furthermore, the execution of the applications is performed without making changes or modifications to the computing device's memory or file system. The portable platform can reside on, for example, a portable memory device, a portable storage device, or downloaded from a web site.

Also, the present invention includes a method for executing software applications on a computing device in a virtual environment. The method includes providing a portable platform that has at least a virtual operating system (VOS) and a plurality of software packages; and executing the plurality of software packages on the computing device using the VOS.

Another embodiment includes a computer program product including a computer-readable medium comprising software instructions operable to enable a computer to perform a method for executing software applications on a computing device in a virtual environment. The computer program product including a portable platform that has at least a virtual operating system (VOS) and a plurality of software packages; and executing the plurality of software packages on the computing device using the VOS.

DETAILED DESCRIPTION OF THE INVENTION

The present invention provides a portable platform that allows a user to run common applications on a computing device without installing or configuring the applications on the computing device. The execution of the applications is performed without making any changes or modification to the computing device's memory or file system. The execution of the applications can be performed on any type of computing device, for example a portable memory device (PMD), a portable storage device, or a web site.

Figure 1:
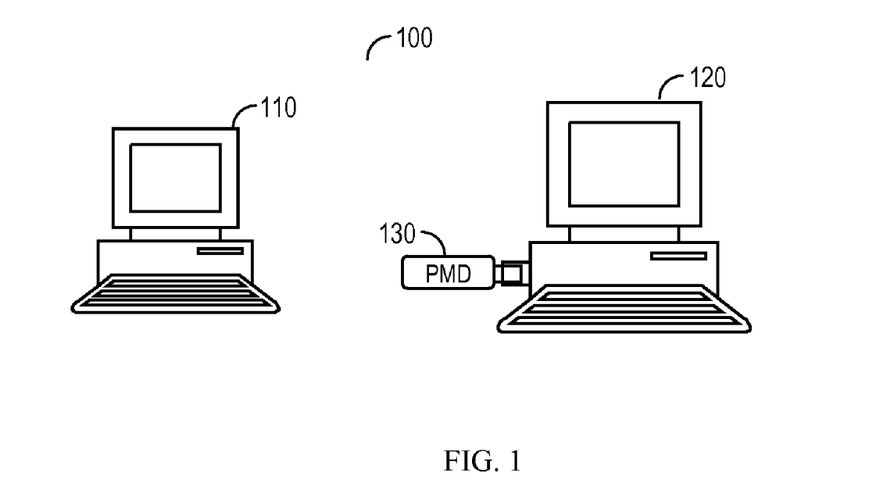
FIG. 1 is a computer system illustrating the principles of the present invention.

FIG. 1 shows an exemplary computer system 100 illustrating the principles of an embodiment of the present invention. Computer system 100 comprises two independent computing devices 110, 120 and a PMD 130. Computing devices 110 and 120 may be, but are not limited to, desktops, notebooks, personal digital assistants (PDAs), cellular phones, networked devices, and other computing devices.

PMD 130 preferably comprises a connector and a non-volatile memory, such as in the form of flash memory, read-only memory, other types of memory or any combinations thereof. The connector of PMD 130 preferably is compatible with a data bus including, but not limited to, a universal serial bus (USB), a parallel bus, a PCI bus, or other types of bus connectors and/or protocols. The computing devices 110, 120 comprise at least one port (not shown) that is compatible with the connector of PMD 130, e.g., a USB port.

To allow the execution of the software applications in the virtual environment (desktop), PMD 130 is equipped with a portable platform and a set of software packages, each of which is related to the software applications. As will be described in greater detail below the portable platform includes a virtual operating system (VOS), setting and data files as well as one or more software packages selected by a user. The portable platform and software packages can be uploaded to PMD 130 in a number a ways including from a web-site, a compact disk (CD) drive of computing device 110, or pre-installed by a software vendor.

The portable platform allows executing applications on a computing device 110 or 120 in a virtual environment. The virtual environment may be, but not is limited to, an execution platform that is independent and separated from computing devices 110 or 120. The virtual environment includes at least one VOS. The portable platform may include a "virtual desktop" through which the user interfaces with the computing device. The virtual desktop is an operating system (OS) shell on which the user wishes to run his applications. A shell is a piece of software that provides an interface for users to the services of a kernel of the operating system. The OS shell may be different from the one that a computing device 110 or 120 is installed with. For example, computing device 120 may run a Windows® Vista and the virtual desktop is of a Windows XP™.

Once the portable platform is installed, PMD 130 can then be taken to computing device 120, connected thereto and the applications stored in PMD 130 can be executed directly on PMD 130. Specifically, when switching to the virtual environment, applications are retrieved on-demand and processed on computing device 120. Once PMD 130 is un-plugged from computing device 120, no tracks (e.g., personalized information and residual data generated during the application runtime) are left on the computing device 120. This is due to the fact that all execution and data files are only generated and kept in PMD 130.

In accordance with another embodiment of the present invention a user can run the virtual environment with his common applications on any computer connected to the Internet. Specifically, the user has to set, through a web site, the portable platform by selecting one or more software packages that comprise his applications and preferably an OS shell of the virtual desktop. Thereafter, the user can execute his applications from any computing device connected to the Internet, just by browsing and logging into a web site that hosts the portable platform. Upon authorization of the user, the computing device is switched to the virtual environment and applications are delivered on demand and processed on the computing device. It would be apparent to a person skilled in the art that the ability to deliver the applications on-demand, allows faster and full functionality execution of applications. This is opposed to prior art solutions that require loading the entire application prior to execution on the computing device. This prior art approach limits the application performance.

Figure 2:
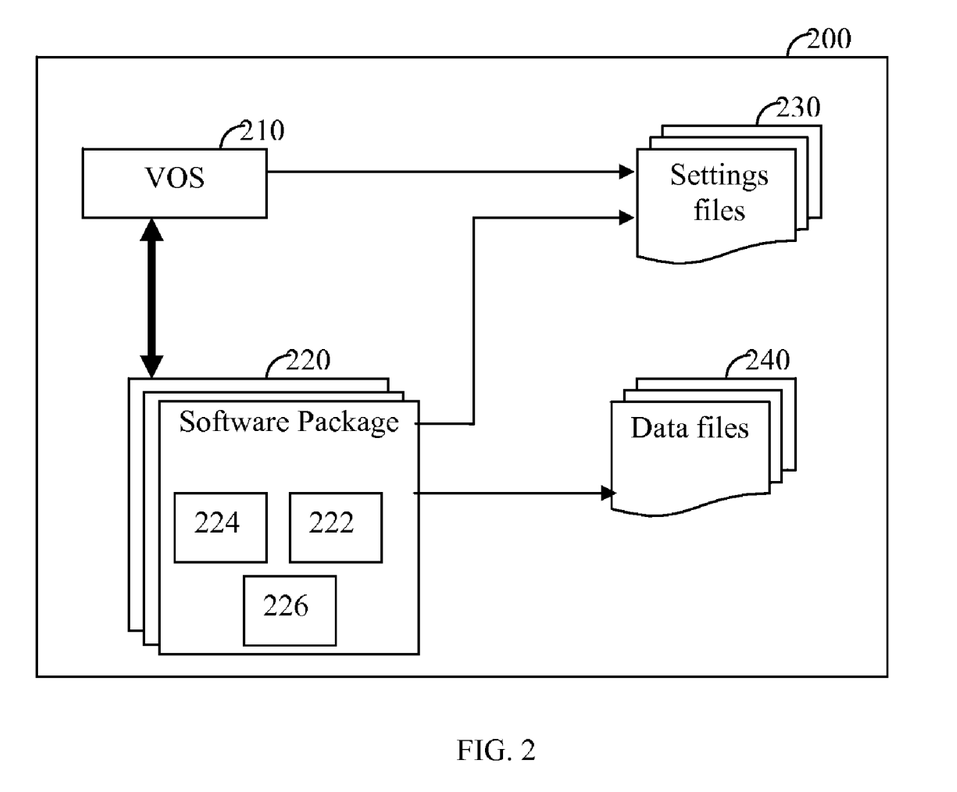
FIG. 2 is a diagram of a portable platform constructed and operative in accordance with an embodiment of the present invention.

FIG. 2 shows a non-limiting diagram of portable platform 200 constructed and operative in accordance with an embodiment of the present invention. Portable platform 200 includes a VOS 210, a plurality of software packages 220, one or more setting files 230, and one or more data files 240. The software packages 220 encapsulate at least one of the following: an OS shell 222 of the virtual desktop, one or more applications 224, such as document processing, spreadsheet management, email exchanges, Internet browsing, media players, and one or more add-ons 226. Each software package 220 may be kept together with a user's personal information, i.e., his favorite appearance, address books, bookmarks, and so on. Setting files 230 include data that is used by VOS 210 for the execution of software packages 220. Setting files 230 may comprise, for example, EXE files, DLL files, SYS files, and a virtual registry file.

The virtual registry file comprises system information describing how to execute the application. Specifically, the virtual registry file contains hardware configuration information, system software configuration information, user security information, current user information and application configuration information. The virtual registry file is derived from the system registry of device 110 and configured to allow the execution of the software packages 220. Data files 240 may include information saved by the user. For example, data files 240 may include documents, images, audio files, video files, emails and the likes.

Figure 3:
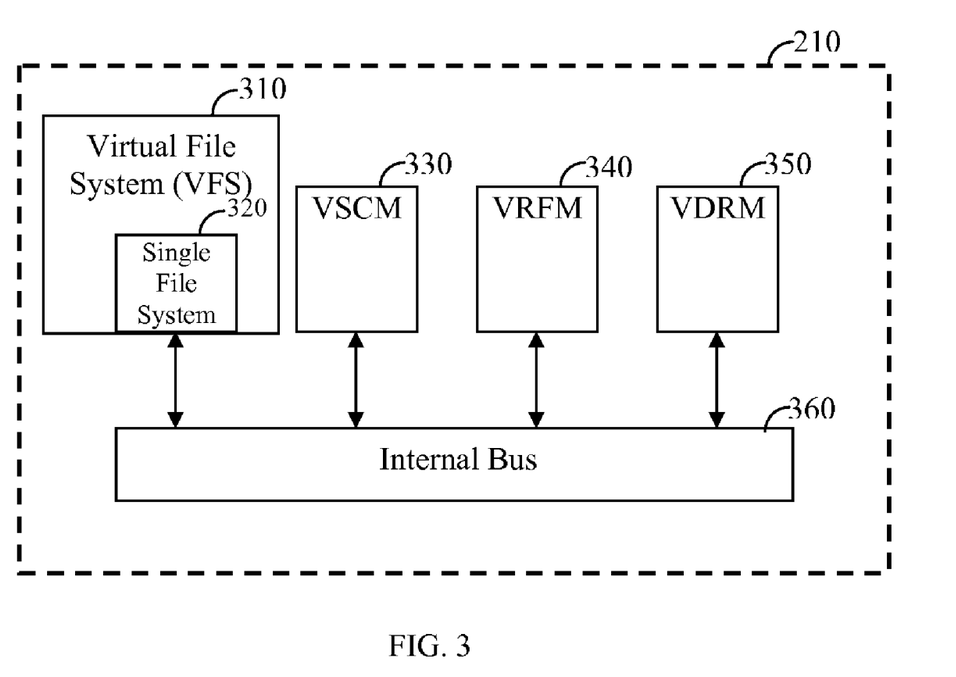
FIG. 3 is a functional diagram of a virtual operating system (VOS) disclosed in accordance with an embodiment of the present invention.

FIG. 3 shows a non-limiting and exemplary functional diagram of VOS 210 disclosed in accordance with an embodiment of the present invention. VOS 210 includes a virtual file system (VFS) 310, a single file system 320, a virtual service manager (VSCM) 330, a virtual registry file manager (VRFM) 340, and a virtual digital rights management (VDRM) 350. Virtual file system 310, VSCM 330, VRFM 340, and VDRM 350 communicate with each other via internal bus 360.

VFS 310 interfaces between the OS running on host computing device (HOS) and the VOS. That is, VFS 310 captures all user-mode system calls of the HOS and distributes each system call to a specific component of VOS 210 that can handle it. VFS 310 further receives the processing results from the components of VOS 210 and sent them back to the HOS.

Single file system 320 translates a set of file system commands of the HOS to a set of commands that can be executed by the portable platform 200 in a user-mode (e.g., USER-32 in Windows). These commands may include, but are not limited to, write, read, seek, remove, and the likes. Once single file system 320 completes the execution of the commands, it returns the processing result to VFS 310. As will be described in greater detail below, VFS 310 handles memory sections in a user-mode and further manipulates the execution of a read file command to allow on-demand data retrieval.

VSCM 330 captures all requests made to the services by an application and creates virtual services to be used during execution of the application in the current virtual environment. Services behave differently from executable applications. Typically, services are shared, run only with administration permission levels, start at the computer computing device's startup, and must be registered in the system registry file. When an executed application requests for a service, VSCM 330 allocates and runs the requested services.

VRFM 340 captures all requests made to the registry file by applications 222 and decides, for each such request, whether it should be directed to a system registry file stored in computing device 120 or to virtual registry file in setting files 230. Any application can request to write and read data to and from the registry file. The determination to which registry file to direct the request is based on the type of data that the application requests to read or write. All write requests are sent to the virtual registry file. The content of the virtual registry file is described in detail above.

VDRM 350 includes the unique hardware signature of the virtual environment, such signature is created when the portable platform is generated. The hardware signature is usually required for the execution of packages 220. The signature may include, but is not limited to, a network map, a device serial ID, a user name, a user ClassID, or any combination thereof. For example, if PMD 130 is a DiskOnKey device the hardware signature includes the disk ID. During execution, software packages 220 may request the computer ID that the application is executed on. In such case, VDRM 350 returns the hardware signature of PDM 130.

One of the advantages of the present invention is the ability to allow users to execute any application from PMD 130 on any computing device, while preventing the user from performing harmful operations on the computing device. This is achieved by allowing a user having only guest access permissions to perform operations as if the user has administrator permissions. Specifically, operations performed on PMD 130 are enabled with administrator permissions and operations executed on computing device 120 are enabled with guest permissions. Therefore, harmful operations can be blocked either by VOS 210 or by the HOS. It would be appreciated by a person skilled in the art that a security layer is provided in addition to those provided by the HOS.

Figure 4:
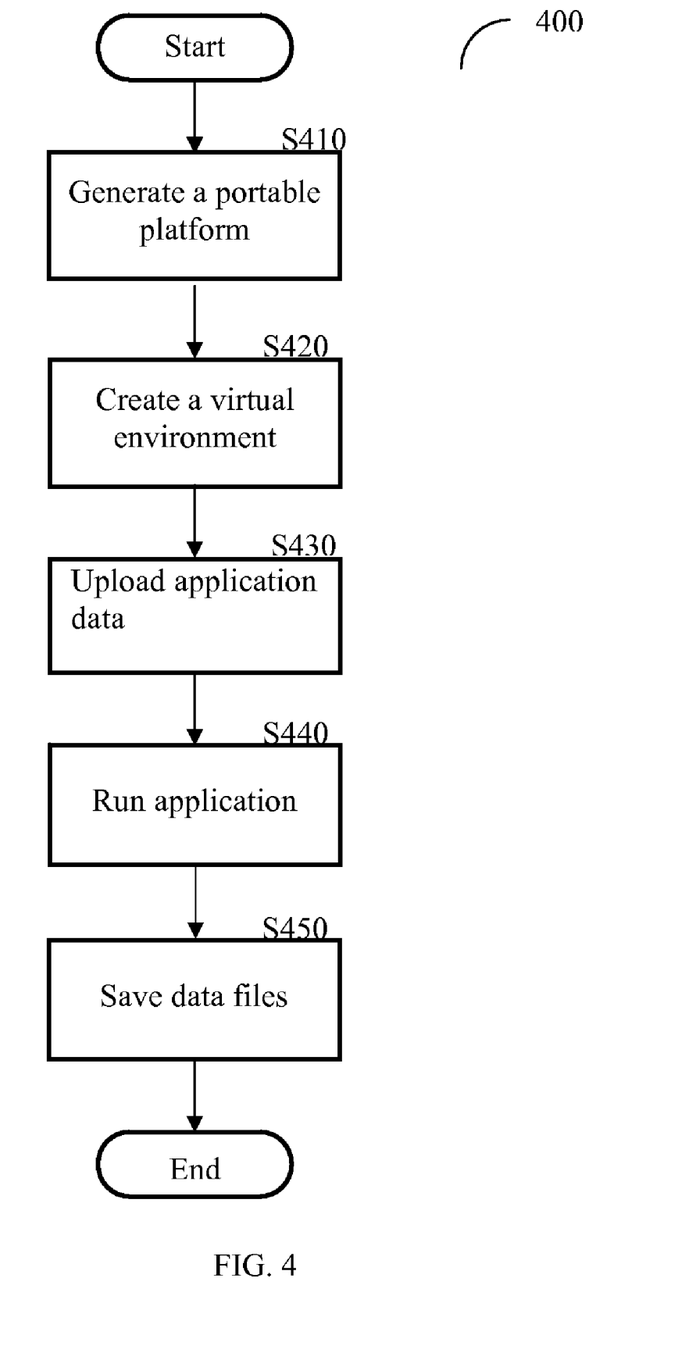
FIG. 4 is a flowchart describing the process for executing applications in a virtual environment.

FIG. 4 shows an exemplary and non-limiting flowchart 400 describing the process for executing software packages on a host computing device, in a virtual environment, in accordance with an embodiment of the present invention. As mentioned above, the software packages may include one or more applications 224 and add-ons 226 as well as a virtual desktop 222. The software packages operate in a sealed environment that is completely isolated from the host computing device and from other applications. That is, while executing software packages in the virtual environment, no data writes are made to the host computing device and vice versa.

At S410 a portable platform is generated by encapsulating a set of software packages that includes the VOS. As mentioned above, the portable platform may be saved on a PMD or downloaded from a web-site. At S420, upon activating the portable platform (i.e., upon connecting the PMD into a host computing device or logging into a web-site) the virtual environment is created. Specifically, the VOS is initialized and the registry files, services and executable files of a software package are uploaded. Thereafter, the virtual desktop (i.e., the operating shell) is run using the VOS as described in greater detail below. Once the virtual environment is created, the user may run the applications and/or add-ons installed on the portable platform. At S430, if the user runs an application data, e.g., registry files, services and executable files in the respective software package are uploaded on-demand. Alternatively or collectivity, the personalized information associated with the application is uploaded to setting files 230 of the portable platform. This would provide the user with the same experience as if the applications were installed natively. At S440, the VOS runs the executable file of the application. Optionally, at S450, any data files created when executing the applications on the host computing devices are saved in data files 240 of the portable platform 200.

It should be noted that a software package that comprises an application or an add-on can be executed without running the virtual desktop. It should be further noted that when executing two or more software packages that require the services of each other, the coupling between the packages is performed at run-time by the VOS.

It should be emphasized that the applications stored in the PMD are executed on the PMD and no data is transferred to the computing device in which the PMD is connected. However, the data generated by the application residing on the PMD may be stored on the PMD.

Figure 5A:
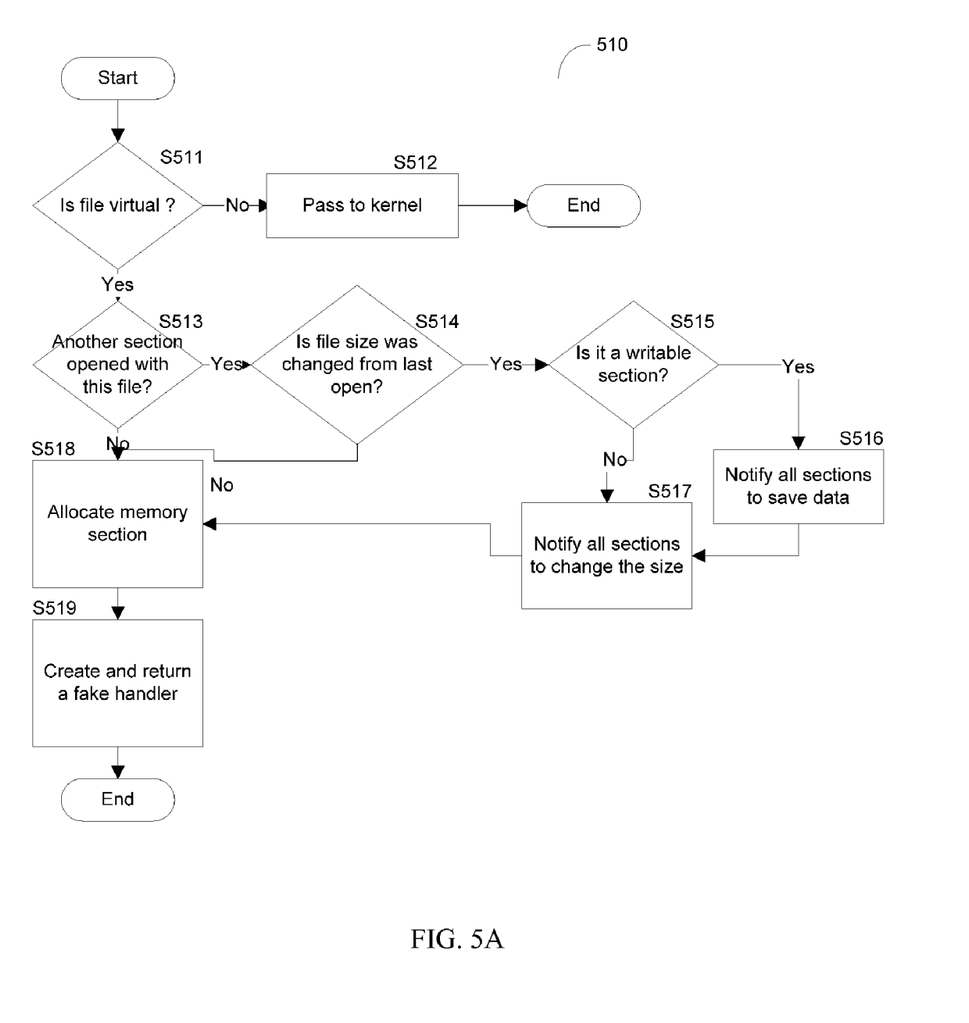
FIGS. 5A, 5B and 5C are flowcharts describing the processes for handling memory sections in a user-mode.
Figure 5B:
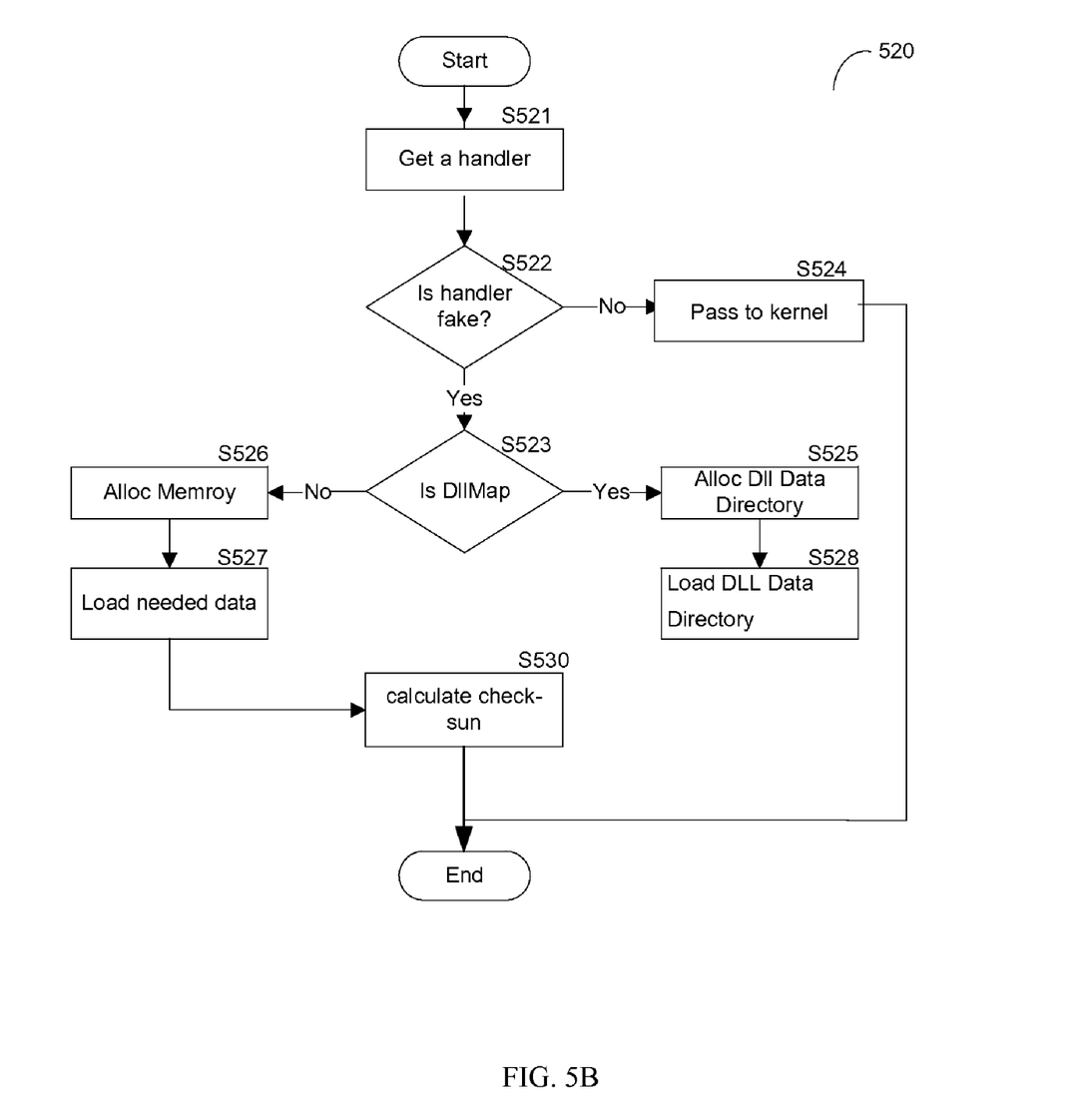
Figure 5C:
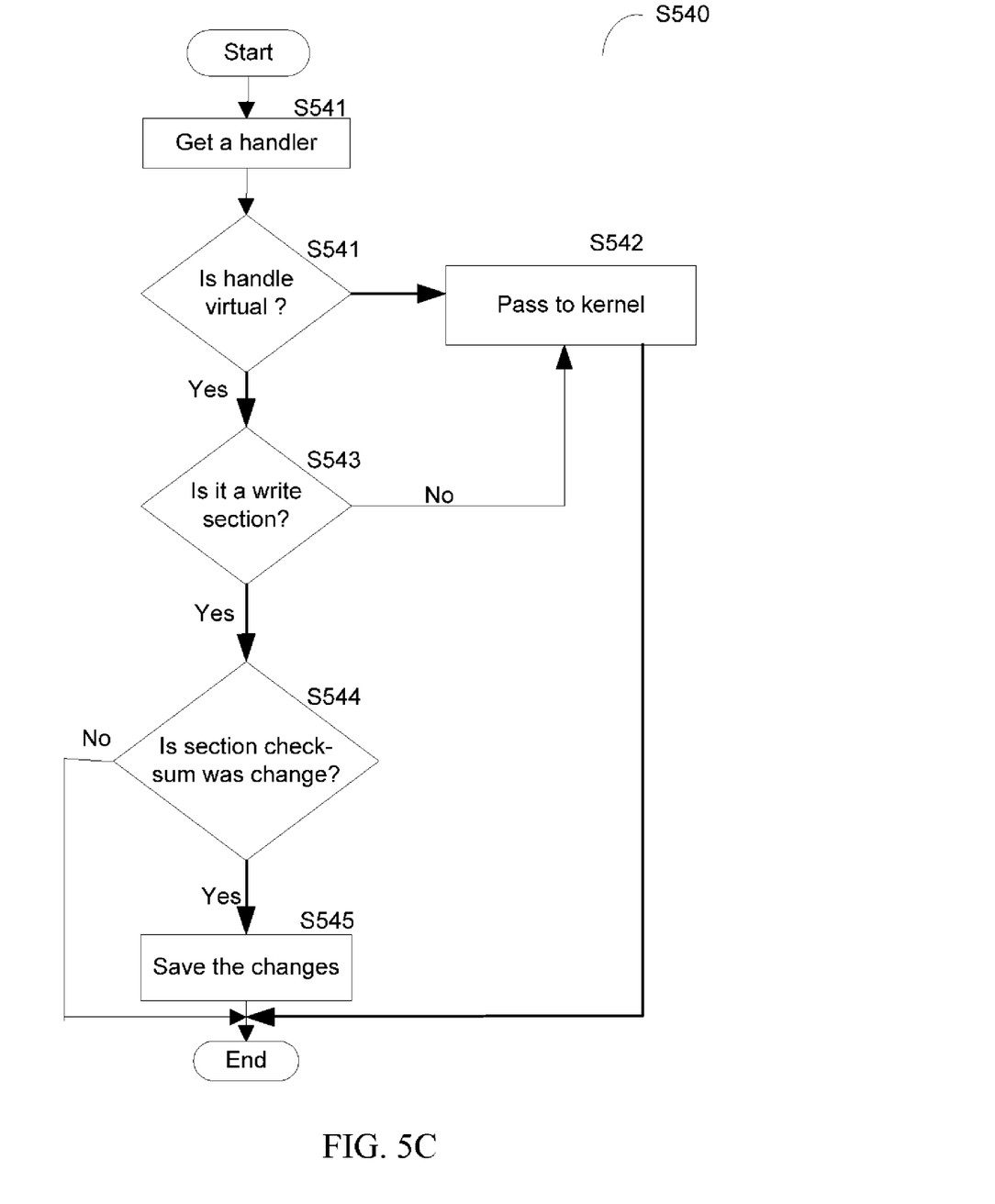

FIGS. 5A, 5B and 5C show an exemplary and non-limiting flowchart 500 describing the method for handling sections in a user mode. Sections are areas in the memory, mapped to files, which an application can access. That is, when a memory area is changed the content of the respective file is also changed. To each section a handle is defined and mapped to an area in the memory. In a traditional file system, sections are handled only by the kernel.

FIG. 5A shows an exemplary flowchart 510 for executing the system call CreateSection in a user-mode. This system call creates a new section for a file. At S511, a check is made to determine if the section should be created for a virtual file (i.e., a file in the portable platform 200). If so, execution continues with S512; otherwise, execution proceeds with S513, the request to create a section is passed to the kernel. At S512, it is checked if a section is already created for this file, and if so execution continues with S514 where another check is made to determine if the file has been changed since the last time that file was opened. If S514 results with an affirmative answer, execution continues with S515 where it is determined whether the created section is a writable section, and if so at S516 all sections, pointing to the same file, are notified to save data; otherwise, at S517 these sections are notified to change their size.

If step S512 or S514 results with a negative answer, execution proceeds with S518 where a memory is allocated to the section according to the current size of the virtual file. At S519, a fake handle is created and returned to the application that called to the system call CreateSection.

FIG. 5B shows an exemplary flowchart 520 illustrating the execution of a system call MapSectionView in a user-mode. The system call receives a section handle and returns a pointer to a memory location of the section. At S521, a section handle is received, and at S522 it is checked whether it is a fake handle. If so, execution continues with S523; otherwise, execution proceeds to S524 where the handle is passed to the kernel. At S523 it is checked whether the handle is of a DLL file, and if so at S525, DLL data directories are allocated. At S528, the required data directories of the DLL are loaded to the memory.

If step S523 results with a negative answer, execution continues with S526 where allocation of a shared memory is performed, and then at S527 data of a file of the respective section is copied to the shared memory. The size of the allocated memory is determined according to an input parameter of the system call MapSection View. At S529, a check sum (e.g., a CRC) on the copied data is calculated, and at S530 a pointer to the location of the data in the shared memory is returned.

FIG. 5C shows an exemplary flowchart 540 describing the execution of a system call SaveSection in a user mode. The system call receives a section handle and writes changes made to the section to the memory. At S541, it is checked if the received handle is a fake handle; and if so, execution proceeds to S543; otherwise, the execution continues with S542 where the system call is executed by the kernel. At S543, it is checked if the section is a writable section, i.e., if the section can be modified, and if so execution continues with S544; otherwise, execution returns to S543. At S544 it is checked if the section was modified, i.e., if one or more data writes were made, and if so at S545 changes made to the section are written to the memory; otherwise, execution terminates.

VFS 310 manipulates the execution of the read file system call in order to allow on-demand data retrieval. Typically, when an application requests to read a file the entire file is loaded, but only a small portion of the file is processed. For example, an application may request a DLL file with a size 100 Kb; and used only 20 Kb of that file. Loading the entire file limits the performance of applications especially when executing them in a virtual environment. To overcome this limitation, VFS 310 manipulates the way that applications read files, to allow loading only the actual data used by the application.

Figure 6A:
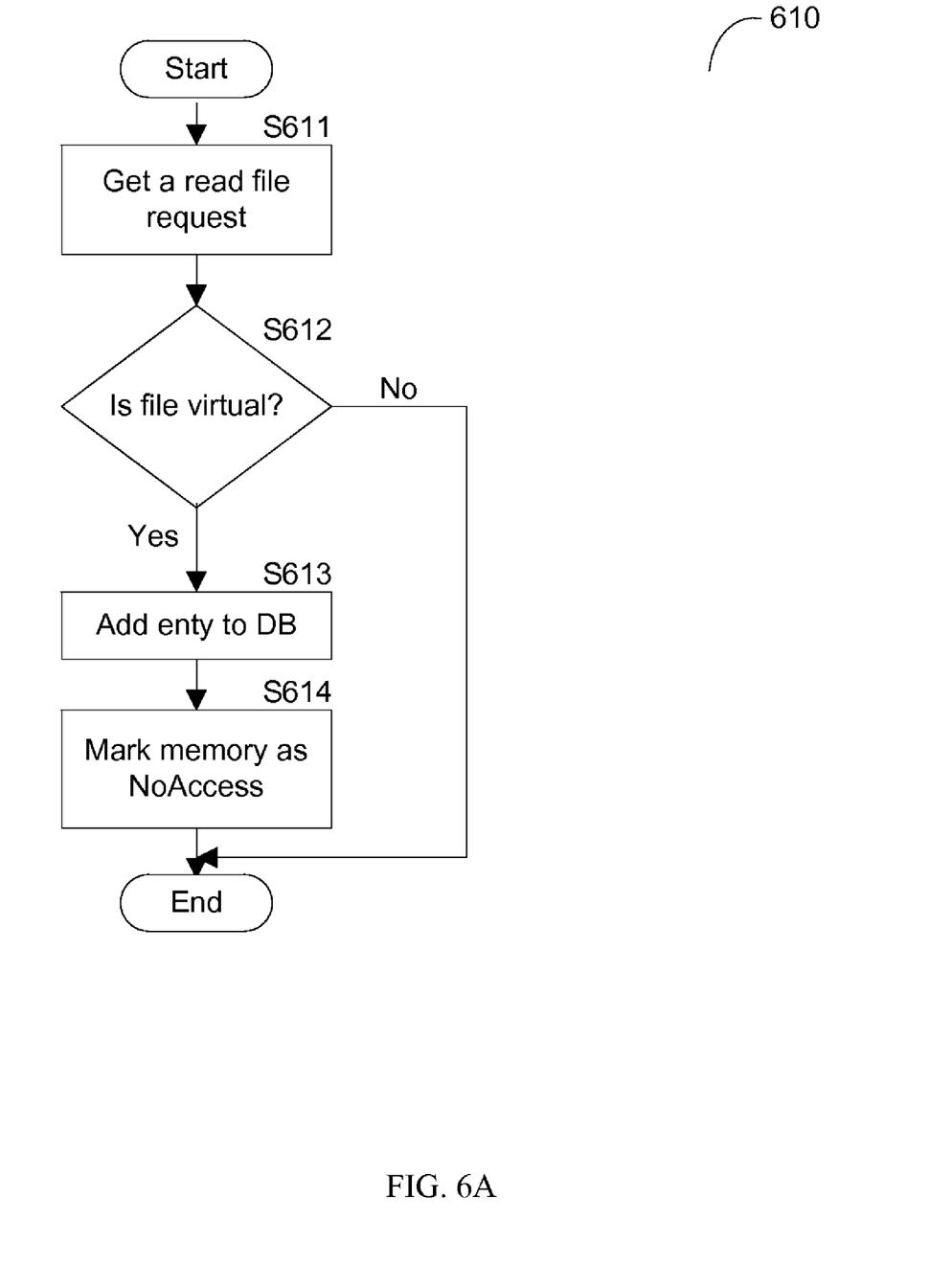
FIGS. 6A and 6B are flowcharts describing the processes of on-demand data retrieval.

FIG. 6A shows an exemplary flowchart 610 describing how a read file request is handled by the VFS 310. At S611, a request to read a file is sent from an application. Generally, a read file request includes the following parameters: a file handle of the requested file, a pointer to a memory location where to read file data, and the number of bytes of data to read. At S612 it is checked if the file handle is a fake handle. If so, at S613 an entry is added to an OnDemand database in the VFS 310; otherwise, execution terminates. The entry in the OnDemand database includes the input parameters received at S611. At S614, the location in the memory pointed by the pointer is marked as no-access. As a result when the application tries this location an exception is generated.

Figure 6B:
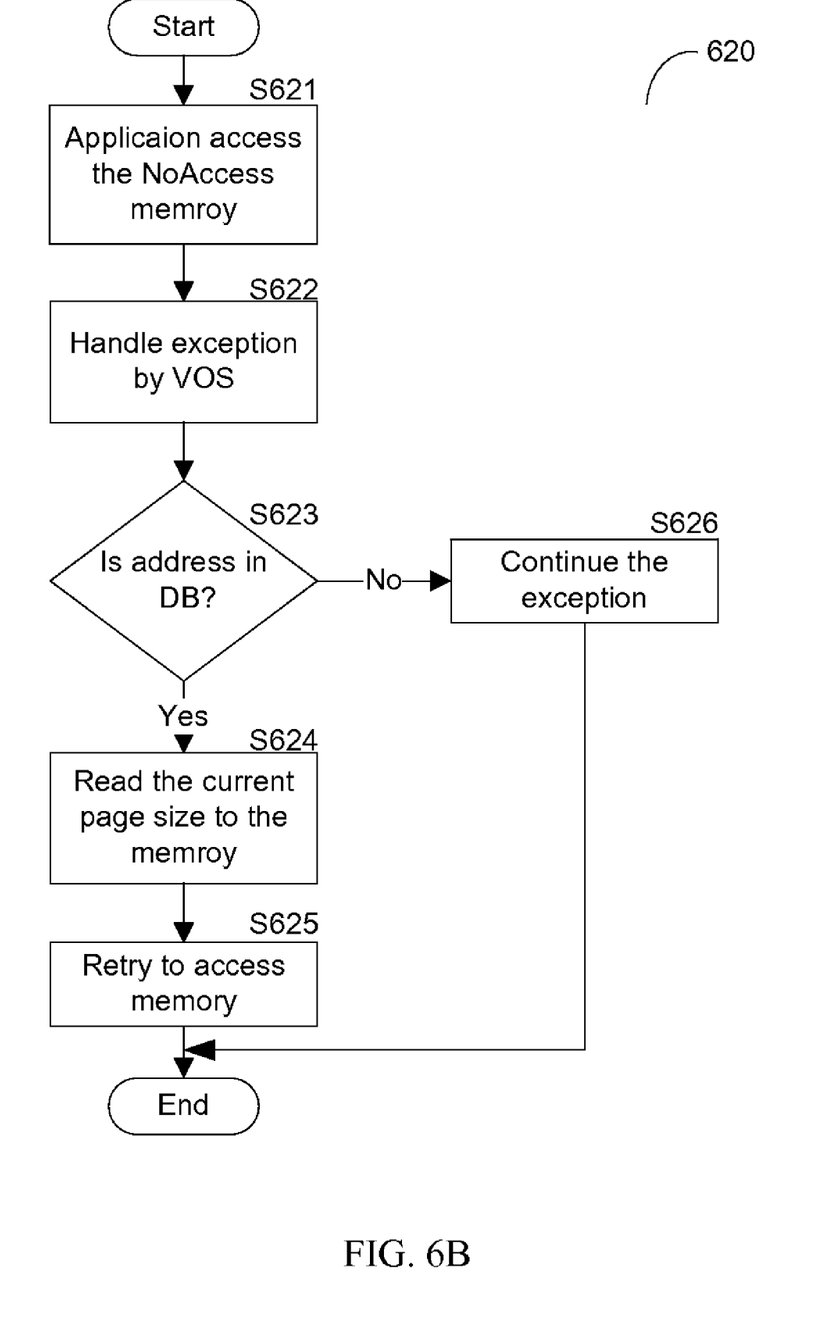

FIG. 6B shows an exemplary flowchart 620 describing how a memory access by an application to read data is handled by the VFS 310. At S621, an application tries to access a memory location to read file data loaded to this location. If the file is a virtual file the memory location is designated as no-access memory. As a result, an exception is generated by the HOS. At S622 this exception is captured by the VSF 310, and thereafter at S623 it is checked if the memory location accessed by the application is found in the OnDemand database. If so, at S624 a data of the file is retrieved and written to the memory location that the pointer is pointing at. The size of the retrieved data equals to a memory page. The location of the data within the file to be retrieved is determined according to the current location of the pointer. At S625, the application is instructed to retry and read data from the memory location that the pointer is pointing at. If S623, results with a negative answer, execution continues with S626 where the exception is handled by the kernel.

In a preferred embodiment, applications residing on the PMD can be executed simultaneously on plurality of computing devices. In such embodiment, the PMD is plugged into a networked device operating in a network. The networked device is connected to a plurality of computing devices that are part of the network. The computing devices include, but are not limited to, personal computers (PCs), personal digital assistants (PDAs), handheld and notebook computers, any other type of handheld or personal wireless electronic device. The network may be a local area network (LAN), a wireless LAN (WLAN) or combination thereof. The WLAN may be based on the IEEE 802.11 standard, WiFi, Bluetooth, infrared or other suitable networking standards and methodologies. Once the PMD is plugged into a networked device, each of computing devices can access and run the applications residing in the PMD. This is performed without installing any application on the computing device. It would be appreciated by a person skilled in the art that this solution would eliminate the need from a user (e.g., a system administrator) to install and configure each computing device with the applications residing in the PMD.

In an embodiment of the present invention, some or all of the method components are implemented as a computer executable code. Such a computer executable code contains a plurality of computer instructions that when performed in a predefined order result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software. The computer executable code may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

It is to be further understood that, because some of the constituent system components and methods depicted in the accompanying drawings may be implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means that can provide those functionalities as equivalent to those shown herein.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for executing software applications on a computing device in a virtual environment, the method comprising:
   providing a portable platform that includes at least a virtual operating system (VOS) and a plurality of software packages; and
   executing the plurality of software packages on the computing device using the VOS, wherein the VOS comprises:
      a virtual file system (VFS) for interfacing between an operating system (OS) running on the computing device and the VOS;
      a single file system for translating a set of file system commands of the computing device to a set of commands to be executed by the portable platform;
      a virtual service manager (VSCM) for generating a virtual environment for the execution of services requested by the software packages;
      a virtual registry file manager (VRFM) for handling registry file requests; and
      a virtual digital rights management (VDRM).

2. The method of claim 1, wherein the portable platform further comprises:
   setting files associated with the plurality of software packages; and
   data files for maintaining information saved by a user.

3. The method of claim 1, wherein each of the plurality of software packages includes at least one of a software application, a virtual desktop, and an add-on.

4. The method of claim 3, wherein the software application comprises at least one of: a document processing software application, a spreadsheet software application, an email exchange software application, an Internet browser software application, and a media player software application.

5. The method of claim 3, wherein the virtual desktop comprises an operating system shell.

6. The method of claim 1, wherein the portable platform is installed on at least one of a portable memory device, and a portable storage device.

7. The method of claim 1, wherein the portable platform is downloaded from a web site.

8. The method of claim 1, wherein executing the plurality software of packages comprising:
   initializing the VOS;
   for each software package, uploading, on-demand, registry files, services and executable files of the software package to the computing device; and
   running the executable files of the software package in a user-mode of the operating system.

9. The method of claim 8, further being capable of coupling between at least two software packages at run-time.

10. The method of claim 1, wherein the computing device comprises at least one of a personal computer, a personal digital assistant, a handheld computer, a notebook computer, and a networked device.

11. The method of claim 1, wherein executing the software applications in a virtual environment comprising:
   executing the software applications without installing the software applications on the computing device.

12. A non-transitory computer program product including a computer-readable medium comprising software instructions operable to enable a computer to perform a method for executing software applications on a computing device in a virtual environment, comprising:
   providing a portable platform that includes at least a virtual operating system (VOS) and a plurality of software packages; and
   executing the plurality of software packages on the computing device using the VOS, wherein the VOS comprises:
      a virtual file system (VFS) for interfacing between an operating system (OS) running on the computing device and the VOS;
      a single file system for translating a set of file system commands of the computing device to a set of commands to be executed by the portable platform;
      a virtual service manager (VSCM) for generating a virtual environment for the execution of services requested by the software packages;
      a virtual registry file manager (VRFM) for handling registry file requests; and
      a virtual digital rights management (VDRM).

13. The non-transitory computer program product of claim 12, wherein the portable platform further comprises:
   setting files associated with the plurality of software packages; and
   data files for maintaining information saved by a user.

14. The non-transitory computer program product of claim 12, wherein each of the plurality of software packages includes at least one of a software application, a virtual desktop, and an add-on.

15. The non-transitory computer program product of claim 14, wherein the software application comprises at least one of: a document processing software application, a spreadsheet software application, an email exchange software application, an Internet browser software application, and a media player software application.

16. The non-transitory computer program product of claim 14, wherein the virtual desktop comprises an operating system shell.

17. The non-transitory computer program product of claim 16, wherein the portable platform is installed on at least one of a portable memory device, a portable storage device.

18. The non-transitory computer program product of claim 12, wherein the portable platform is downloaded from a web site.

19. The non-transitory computer program product of claim 12, wherein executing the plurality software packages comprising :
  initializing the VOS;
  for each software package, uploading, on-demand, registry files, services and executable files of the software package to the computing device; and
  running the executable files of the software package in a user-mode of the operating system.

20. The non-transitory computer program product of claim 19, further being capable of coupling between at least two software packages at run-time.

21. The non-transitory computer program product of claim 12, wherein the computing device comprises at least one of: a personal computer, a personal digital assistant, a handheld computer, a notebook computer, and a networked device.

22. The non-transitory computer program product of claim 12, wherein executing the software applications in a virtual environment comprising:
  executing the software applications without installing the software applications on the computing device.

23. A portable platform includes a storage media for allowing the execution of a plurality of software applications on a computing device in a virtual environment, the portable platform comprising:
  a plurality of software packages; and
  a virtual operating system (VOS) for enabling the execution of the software applications on a computing device, wherein the VOS comprises:
    a virtual file system (VFS) for interfacing between an operating system (OS) running on the computing device and the VOS;
    a single file system for translating a set of file system commands of the computing device to a set of commands to be executed by the portable platform;
    a virtual service manager (VSCM) for generating a virtual environment for the execution of services requested by the software packages;
    a virtual registry file manager (VRFM) for handling registry file requests; and
    a virtual digital rights management (VDRM).

24. The portable platform of claim 23, further comprising:
  setting files associated with the software packages; and
  data files for maintaining information saved by a user.

25. The portable platform of claim 23, being installed on at least one of a portable memory device, a portable storage device.

26. The portable platform of claim 23, wherein each of the plurality of software packages includes at least one of a software application, a virtual desktop, and an add-on.

27. The portable platform of claim 23, wherein the portable platform is downloaded from a web site.

28. The portable platform of claim 23, wherein executing the plurality software packages comprising:
  initializing the VOS;
  for each software package, uploading, on-demand, registry files, services and executable files of the software package to the computing device; and
  running the executable files of the software package in a user-mode of the operating system.

29. The portable platform of claim 28, further being capable of coupling between at least two software packages at run-time.

30. The portable platform of claim 23, wherein the computing device comprises at least one of:
  a personal computer, a personal digital assistant, a handheld computer, a notebook computer, and a networked device.

31. The portable platform of claim 23, wherein executing the software applications in a virtual environment comprising:
  executing the software applications without installing the software applications on the computing device.

* * * * *